April 28, 1970 KATSUHIKO TSUNODA 3,508,820

MOVIE FILM

Filed April 3, 1967

INVENTOR
KATSUHIKO TSUNODA

BY Sughrue, Rothwell, Mion, Zinn & Macpeak
ATTORNEYS.

United States Patent Office 3,508,820
Patented Apr. 28, 1970

3,508,820
MOVIE FILM

Katsuhiko Tsunoda, Kanagawa, Japan, assignor to Fuji Photo Film Co., Ltd., Kanagawa, Japan

Filed Apr. 3, 1967, Ser. No. 627,837
Claims priority, application Japan, Apr. 2, 1966, 41/20,575
Int. Cl. G03c *1/76*
U.S. Cl. 352—235 3 Claims

ABSTRACT OF THE DISCLOSURE

A motion picture film having a plurality of serrations at each end. Each serration has one driving edge perpendicular to the edge of the film for driving the film in one direction only and extending inwardly to a depth sufficient to include the sprocket hole. The opposite edge of the serration extends at an angle to the edge of the film. The longitudinal length of the serrations is less than the distance between the sprocket holes so that upon the drive member reaching the area of the serrations the film will be stopped but upon reversal of the drive member the film will be driven in the opposite direction.

BACKGROUND OF THE INVENTION

In prior art cinema film, in particular, film for single-8 systems or super-8 systems, the perforations are sometimes too small to be engaged with the film advancing claw of a camera to enable the film to be advanced therein. Therefore, strict standards are required for cameras. A camera using a film-pressure plate must be so constructed that the claw is drawn back when the film is loaded. In a camera of less precision, there is usually employed a non-film-pressure-plate system. The single-8 system of the present invention is capable of photographing with subsequent rewinding because of the characteristics of the system.

Other features of the invention will be pointed out in the following description and claims and illustrated in the accompanying drawings, which disclose, by way of example, the principles of the invention and the best mode which has been contemplated of applying those principles.

Figure 1:
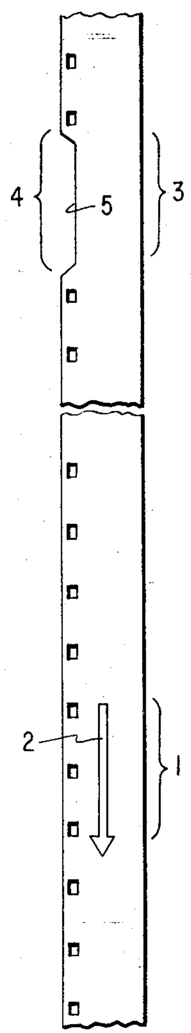
FIG. 1 is a front view of a prior art single-8 film.

With reference to FIG. 1, a film in a single-8 cartridge has an arrow 2 showing the running direction on the starting position 1 and has trapezoid or rectangular cut 5 in the end part 3 of the film, so that the claw can idle and the film does not continue to advance. In such a system, errors occur when loading the cartridge in a camera, in that the claw is not engaged with the perforations of the starting position 1 and the claw idles, whereby the film is not advanced at all. When the film is advanced and the end-part 3 comes to the claw, it is too late to run the film reversely, because the claw idles at cut 5. Therefore, reverse photographing, double photographing and rewinding are impossible. Moreover, when the film is run reversely and rewound throughout the length by preventing cut 5 from reaching the claw, some overloads fall on the driving mechanism of the camera, such as the claw and motor. These overloads occur because said rewinding extends beyond the normal start mark, that is, arrow 2 of starting position 1, and the running of the film is forcedly stopped. In rephotographing, it is then necessary to take the cartridge out of the camera and to roll the film up to the start mark.

Figure 2:
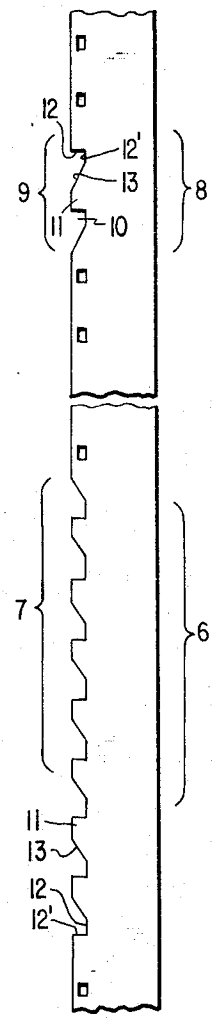
FIG. 2 is a front view of the new single-8-film, both being viewed from the films emulsion side.

In the cinema film of the invention, as shown in FIG. 2, there is provided a serration on the places to be perforated in the starting position and the end part of the film so that reverse running becomes impossible once the end part of the film reaches the claw and the rewinding will continue only to the starting position of the film.

FIG. 2 shows an essential part of the cinema film of the invention. Acute-angled cut 10 is formed as a serration on sites 7, 9 at the starting portion 6 and the end portion 8 of the film, respectively. The direction of serrated projections 11 are reverse to that of the normal feed of the film in starting portion 6 and the same as that of the normal feed of the film in end portion 8.

When a cartridge with this film is loaded into a camera, its claw is engaged with the cut without fail and catches the deepest portion 12 of the cut, that is, root 12 of the serrated projections thereby running the film normally, while it races along inclined side 13 thereof in the reverse direction of operation. When end portion 8 of the film reaches the site of the claw after the normal running, the claw races along inclined side 13 and cannot un the film any further. The operation being changed into reverse as it is, however, the claw catches depth 12 of the cut, that is, root 12 of the serrated projection, thereby running the film reversely.

Since our invention is such as mentioned above, a claw of a camera is readily engaged witih the perforations of the film and even if the site of the claw is not exactly correct, the film can be started. Charging of the film is made possible in a camera equipped with a film-pressure-plate even if it is provided with no claw draw-back mechanism at loading, that is, with the claw protruding. In the case of running reversely and unwinding the film throughout its length, the claw will run idle in the start-part of the film, and said unwinding running of the film is stopped there and rephotographing can be started as occasion demands. In addition, since there is a clear difference between the shapes of the film before and after photographing, that is, the starting portion and the end portion, no mistakes will occur.

Obviously, many modifications and variations of the present invention are possible in the light of the above teachings. It is, therefore, to be understood, that within the scope of the appended claims, the invention may be practiced otherwise than as specifically described.

What is claimed is:

1. In a movie film of the type having a plurality of holes extending along and spaced inwardly from one edge thereof for the reception of a driving member, the improvement comprising: a first plurality of serrations formed in said edge at the starting portion of said film and extending inwardly from said edge to a depth including the holes to be engaged by the driving member for driving said film in one direction only, and a second plurality of serrations formed in said edge at the end portion of said film and extending inwardly from said edge to a depth including the holes to be engaged by said driving member for driving said film in a direction opposite to said one direction only.

2. A film as set forth in claim 1 where said first and second serrations are each formed with a driving edge perpendicular to said edge and a non-driving edge disposed at an angle relative to said driving edge in a trailing direction relative to the direction of movement of the film when said driving member is in engagement with said driving edge.

3. A film as set forth in claim 2 wherein the non-driving edges of said first serrations extend in a direction opposite to the direction of said non-driving edges of said second serrations.

References Cited

UNITED STATES PATENTS

| | | | |
|---|---|---|---|
| 1,450,795 | 4/1923 | Dohe | 352—241 X |
| 1,696,968 | 1/1929 | Outrey | 352—92 |

| | | | |
|---|---|---|---|
| 1,836,124 | 12/1931 | Kuchenmeister | 352—241 X |
| 3,053,140 | 9/1962 | Brogan | 242—55.11 X |

FOREIGN PATENTS

| | | |
|---|---|---|
| 776,032 | 1/1935 | France. |

NORTON ANSHER, Primary Examiner

MONROE H. HAYES, Assistant Examiner

U.S. Cl. X.R.

352—241